United States Patent [19]

Ronai

[11] Patent Number: 5,186,514
[45] Date of Patent: Feb. 16, 1993

[54] TRUCK BOX COVER APPARATUS

[76] Inventor: Christian Ronai, 3570 St-Germain St., Montreal, Quebec, Canada, H1W 2V5

[21] Appl. No.: 839,575

[22] Filed: Feb. 21, 1992

Related U.S. Application Data

[63] Continuation-in-part of Ser. No. 687,717, Apr. 18, 1991, abandoned.

[30] Foreign Application Priority Data

Apr. 19, 1990 [CA] Canada ................................ 2014863
Jun. 13, 1990 [CA] Canada ................................ 2018973
Dec. 4, 1990 [CA] Canada ................................ 2031410

[51] Int. Cl.$^5$ ............................................. B60J 7/10
[52] U.S. Cl. ................................................... 296/100
[58] Field of Search ................ 296/100, 98; 160/269, 160/290.1

[56] References Cited

U.S. PATENT DOCUMENTS

| | | |
|---|---|---|
| 3,472,548 | 10/1969 | Comisac . |
| 3,649,072 | 3/1972 | Cross . |
| 3,756,650 | 9/1973 | Michel ................................ 296/100 |
| 3,901,548 | 8/1975 | Seaman, Jr. ....................... 296/100 X |
| 4,036,521 | 7/1977 | Clenet ................................ 296/100 |
| 4,199,188 | 4/1980 | Albrecht et al. .................... 296/100 |
| 4,252,362 | 2/1981 | Campbell . |
| 4,518,194 | 5/1985 | Kirkham et al. . |
| 4,547,014 | 10/1985 | Wicker . |
| 4,550,945 | 11/1985 | Englehardt . |
| 4,611,848 | 9/1986 | Romano . |
| 4,747,441 | 5/1988 | Apolzer et al. . |
| 4,784,427 | 11/1988 | Burgess . |
| 4,786,099 | 11/1988 | Mount . |
| 4,795,206 | 1/1989 | Adams . |
| 4,807,921 | 2/1989 | Champie, III et al. . |
| 4,889,381 | 12/1989 | Tamblyn et al. . |
| 4,932,704 | 6/1990 | Ament . |
| 4,941,705 | 7/1990 | Wurtz . |
| 4,943,194 | 7/1990 | Aguilar ............................ 296/100 X |
| 4,974,898 | 12/1990 | Baranski . . |
| 4,991,640 | 2/1991 | Verkindt et al. . |

FOREIGN PATENT DOCUMENTS 1259361 8/1988 Canada .

Primary Examiner—Charles A. Marmor
Assistant Examiner—Joseph D. Pape
Attorney, Agent, or Firm—Collard & Roe

[57] ABSTRACT

A pick-up truck box cover apparatus comprises: a cover member being rigid about a lengthwise axis and having two lengthwise sides, two lengthwise tracks to be attached to an upper surface of two vertical sidewalls, the tracks being adapted to vertically receive the two sides of cover member; and a locking member provided on each of the two tracks for preventing and allowing cover member from being vertically removed from the tracks, and for preventing the cover member from sliding lengthwise along tracks. Cover member can be placed onto and removed from tracks from above and be locked into tracks to secure contents of box, cover is rigid and resistant to tampering when locked. A crosswise divider can also be provided to partition box.

18 Claims, 6 Drawing Sheets

TRUCK BOX COVER APPARATUS

This is a continuation-in-part of copending application Ser. No. 07/687,717 filed on Apr. 18, 1991, now abandoned.

FIELD OF THE INVENTION

The present invention relates to a cover apparatus for a load container having a rectangular opening and in particular to a pick-up truck box cover apparatus.

BACKGROUND OF THE INVENTION

Pick-up truck cover apparatus for covering pick-up truck boxes are well known in the prior art for the purposes of protecting the box from the elements or theft. The most common form and the least expensive apparatus known is a waterproof tarpaulin manually fixed by snaps around the perimeter of the box. Such canvas or tarpaulin covers are difficult to install or remove, they are difficult to store, they do not support the weight of a snowfall very easily, and they offer little or no theft protection.

Other apparatus are known in the art, which offer some protection from theft and relative ease of storage, such as U.S. Pat. No. 4,807,921 (CHAMPY et al.), wherein a sliding articulated metal cover slides in a track along the lengthwise side of the pick-up truck box and locks into the tail gate to provide a complete truck box cover.

Such known apparatus which slide over the upper surface of the pick-up truck box in order to provide a secure rigid cover, have the drawback that they occupy space within the truck box and require either difficult installation or substantial cost in their manufacture. It is furthermore a disadvantage with the conventional sliding articulated truck box covers that the known covers open from one end only and therefore access to the contents can only be had once the sliding cover is opened to the point in the truck box where access is required.

It is an object of the present invention to provide an easy to use, secure and weatherproof pick-up truck box cover apparatus which is able to offer easy and quick access to the contents of the truck box, a relatively low cost, ease of storage when not in use, and easy installation.

SUMMARY OF THE INVENTION

According to a first aspect of the invention, there is provided a pick-up truck box cover apparatus able to securely cover a pick-up truck box, the box having two vertical sidewalls, a front vertical wall adjacent a cab of the truck and a rear gate wall pivotable between a vertical closed position and a horizontal open position, the cover apparatus comprising: a cover member being rigid about a lengthwise axis and having two lengthwise sides, the cover member covering all of the box; two lengthwise tracks to be attached to an upper surface of the two vertical sidewalls, the tracks receiving vertically the two sides of the cover member; and a locking member provided on each of the two tracks for preventing the cover member from being vertically removed from the tracks, and for preventing the cover member from sliding lengthwise along the tracks when locked, and for allowing the cover member to be removed from the tracks when unlocked, whereby the cover member can be placed onto and removed from the tracks from above and be locked into the tracks to securely seal off contents of the box, the cover being rigid and resistant to impact and motion due to tampering when locked.

According to another aspect of the invention, there is provided a pick-up truck box cover apparatus able to securely cover a pick-up truck box, the box having two vertical sidewalls, a front vertical wall adjacent a cab of the truck and a rear gate wall pivotable between a vertical closed position and a horizontal open position, the cover apparatus comprising: a cover member being rigid about a lengthwise axis and having two lengthwise sides, the cover member covering a lengthwise part of the box; two lengthwise tracks to be attached to an upper surface of the two vertical sidewalls, the tracks receiving vertically the two sides of the cover member; a crosswise divider and supporting means for supporting the crosswise divider for partitioning the box into separate compartments, the cover member covering at least one partition formed by the divider; and a locking member provided on each of the two tracks for preventing the cover member from being vertically removed from the tracks, and for preventing the cover member from sliding lengthwise along the tracks when locked, and for allowing the cover member to be removed from the tracks when unlocked, whereby the cover member can be placed onto and removed from the tracks from above and be locked into the tracks to securely seal off contents of the box, the cover being rigid and resistant to impact and motion due to tampering when locked.

Preferably, each locking member comprises an articulated or hinged flap member articulated lengthwise about an axis parallel to one of the tracks on an outer side thereof, such that the flap can be pivoted inward and over one of said lengthwise sides, securing means for releasably locking the articulated flap in a position covering one of the lengthwise sides, and pin means for securing the cover member against lengthwise movements once the cover is vertically placed into the tracks, the pin means cooperating between the cover member and one of the tracks. Thus, on each side of the truck box, a unit including the lengthwise track, the articulated flap member, the securing means and the pin means can be provided for easy installation. The cover member is then simply placed in the tracks and can be slid lengthwise along the tracks or rolled in the tracks, in order to move it therealong, or the cover member may be lifted from either end in order to gain access to the truck box. It is to be understood that the cover member means the cover or covers which are used to cover the rectangular opening of the box.

Also, preferably, the cover member is either made of a flexible sheet material connected to a plurality of spaced apart cross ribs extending the two tracks and able to provide rigidity about the lengthwise axis, a first one of said cross ribs being provided at a forward end of the cover member and being locked by said pin means, a last one of said ribs being provided at a rear end of the cover member and being locked by said pin means, so that the cover member is foldable or rollable about a crosswise axis, or one or more solid sheets of material. The cover member is always removable from the tracks by lifting it out, either for storage or to gain access to the contents.

BRIEF DESCRIPTION OF THE DRAWINGS

The invention will now be better understood as a result of the following detailed description of the preferred embodiments with reference to the appended drawings, in which.

DETAILED DESCRIPTION OF THE PREFERRED EMBODIMENT

Figure 1:
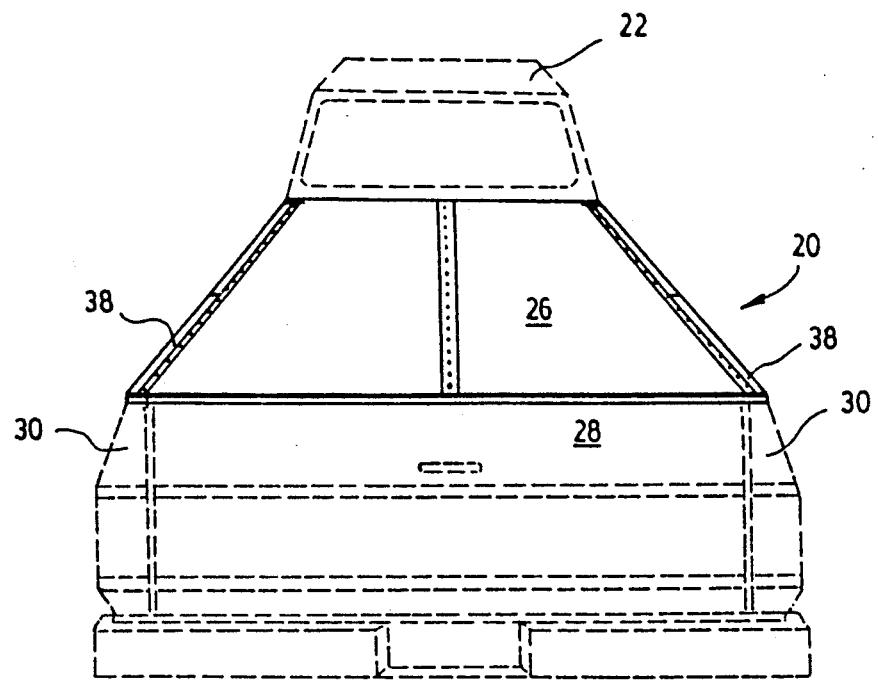
FIG. 1 shows a rear perspective view of a truck provided with the cover apparatus closed and locked by the articulated flap members.
Figure 2:
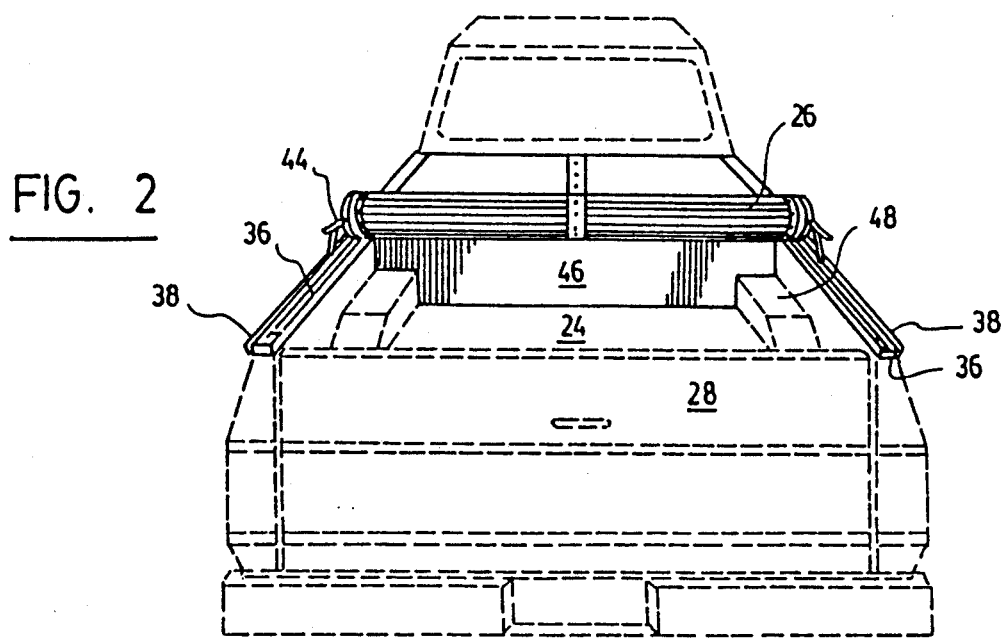
FIG. 2 shows the view of FIG. 1 with the cover member partly rolled up and tied down in place.
Figure 3:
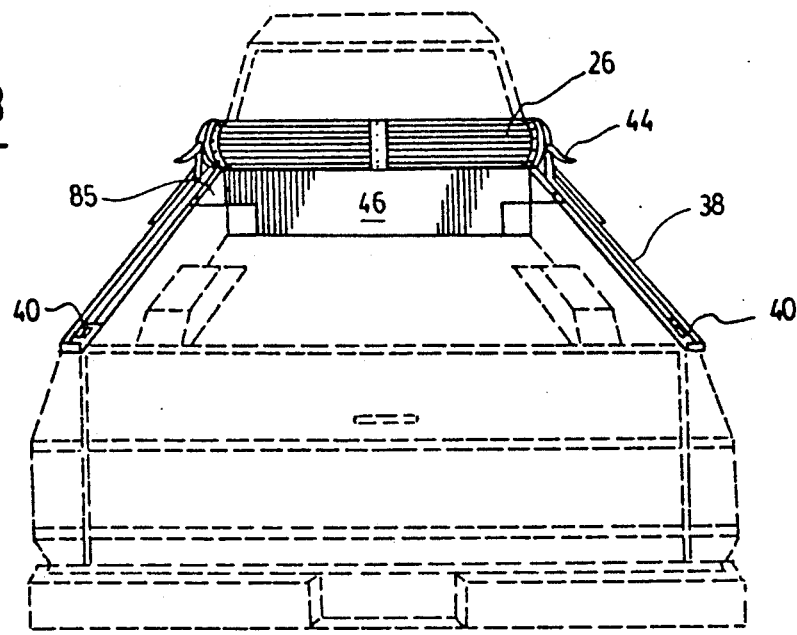
FIG. 3 is a view similar to FIG. 1 showing the cover member completely rolled up and secured to rest on top of the tracks.

As shown in FIGS. 1, 2 and 3, pick-up truck (22) is provided with the box cover apparatus (20) for securely covering the pick-up truck box. The box (24) has two vertical sidewalls (30), a front vertical wall (34) adjacent a cab of the truck (22) and a rear gate wall (28) pivotable between a vertically closed position and a horizontal open position. In the first preferred embodiment, the cover apparatus comprises a cover member (26) which is rigid about a lengthwise axis of the box and the cover member (26) has two lengthwise sides which are received in two lengthwise tracks (36). The cover member (26) covers all of the opening of the box (24). The two lengthwise tracks (36) are attached to upper surfaces of the two vertical sidewalls (30), and the tracks (36) are adapted to vertically receive the two sides of the cover member (26). A locking member (38) is provided on each of the two tracks (26) for preventing and allowing the cover member (26) from being vertically removed from the tracks (36), and for preventing the cover member from sliding lengthwise along the tracks (36). As can be seen, cover (26) can be rolled up in order to gain access to box (24), and the rolled-up cover (26) can be tied down by straps (44) to tracks (36) or to the locking member (38).

A crosswise divider member (46) is shown in FIG. 2, which divides box (24) into a smaller forward section and a larger rearward section.

Figure 4:
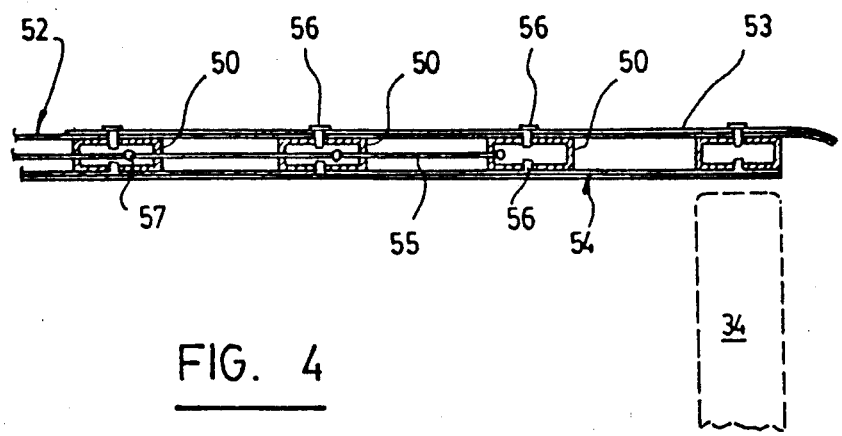
FIG. 4 is a break-away cross sectional view of the rollable cover member at the front of the truck box.
Figure 5:
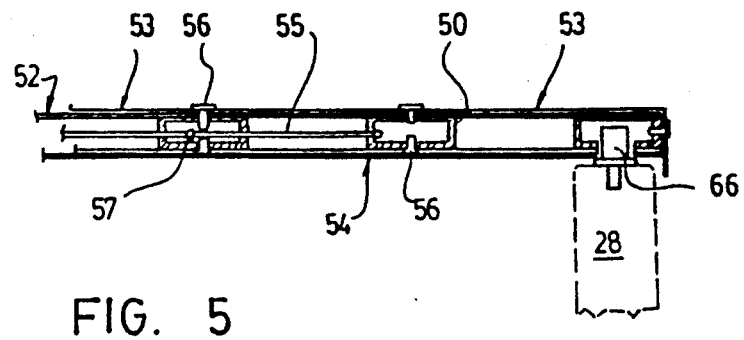
FIG. 5 shows a partial cross-sectional view of the rollable cover member of FIG. 4 as attached to the tail gate.

As shown in FIGS. 4 and 5, the cover (26) is made of a series of rigid tubular ribs (50) which extend crosswise across the opening of box (24) in order to provide rigidity about the lengthwise axis, and a flexible sheet material (52) which extends over an entire upper surface of cover (26). Ribs (50) are riveted to cover (52) by means of rivets (56), and friction strips (53, 54) are provided along the sides and middle of cover (26) having about a two inch width lengthwise on the upper and lower sides of cover (26).

A steel wire (55) interconnecting in a loose fashion ribs (50) is provided along the sides of cover (26) and has stoppers (57) for preventing separation of the ribs (50), so that if the sheet material (52) is cut open with a knife, it still remains difficult to separate ribs (50) in order to gain access to the contents of box (24) without using heavy duty wirecutters to cut at least one wire (55) hidden under articulated or hinged flap (38) in order to cause the separation of ribs (50).

As shown in FIG. 5, a pin or post (66) which is anchored into tail gate (28) fits into holes provided in the last rib (50) of cove (26) in order to lock the tail gate with the cover.

Figure 6A:
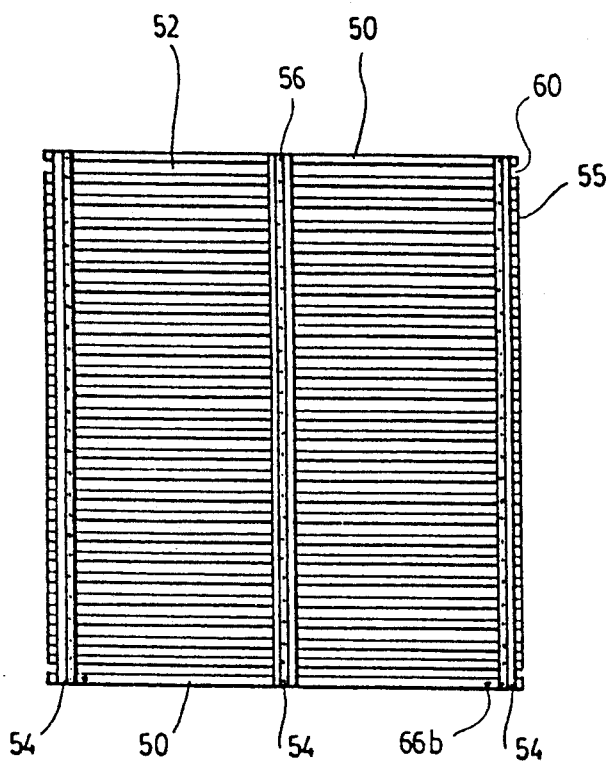
FIG. 6a shows a bottom view of the rollable cover member.
Figure 6B:
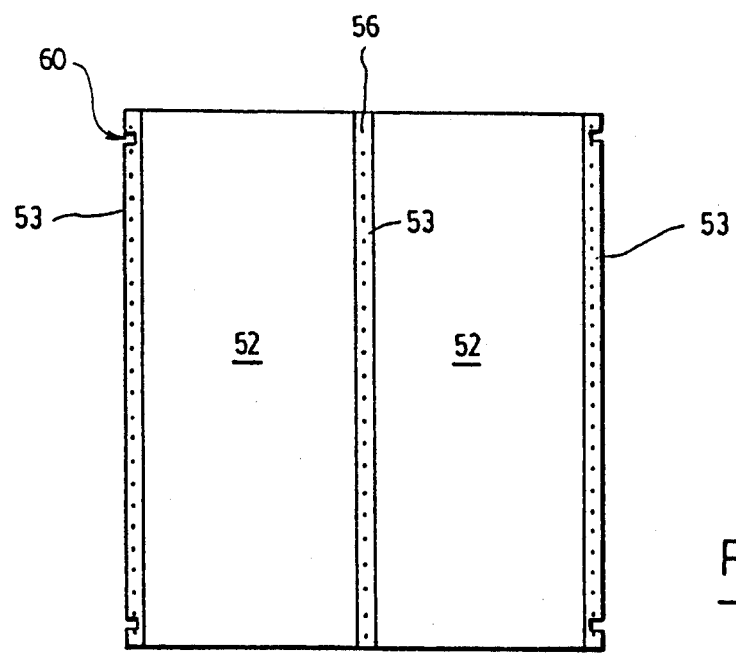
FIG. 6b shows a top view of the rollable cover member.

As shown in FIG. 6b, sheet material (52) covers the entire surface, and it is shown that the rivets are provided along the sides and central portion of the cover (26). The strips (53) function as an upper friction strip which when making contact with lower friction strip (54) facilitates rolling of the cover (26). The strips (53) also limit abrasion of the tarp (52). It is also possible for strips (53) not to cover but to surround rivets (56), thus keeping the surface of cover (26) flush and free from abrasion by rivets (56).

It has been found that using a strong vinyl material for cover material (52) without the addition of friction strips (54) makes it difficult to roll cover (26), since the material (52) has a tendency not to adhere to the ribs (50) and simply to fold and slide. As shown in FIG. 6a, spaces (60) between the first and last ribs (50) and their adjacent ribs (50) meet with pins (40) (shown in FIGS. 3 and 8) for the purposes of preventing a longitudinal sliding of cover (26) when enclosed by the locking means (38). Pins (40) gently lift the tarp (52) to keep key lock (42) dry and clean.

Figure 7A:
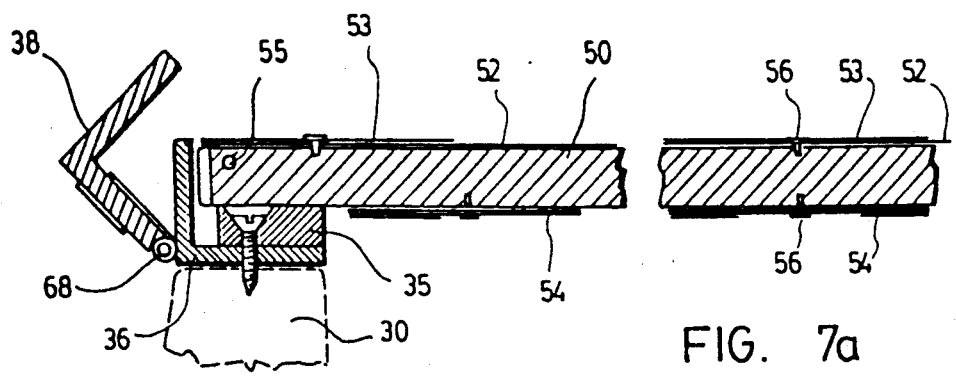
FIG. 7a is a detailed cross section view showing the cross-rib of the cover, the articulated flap member and the tracks.
Figure 7B:
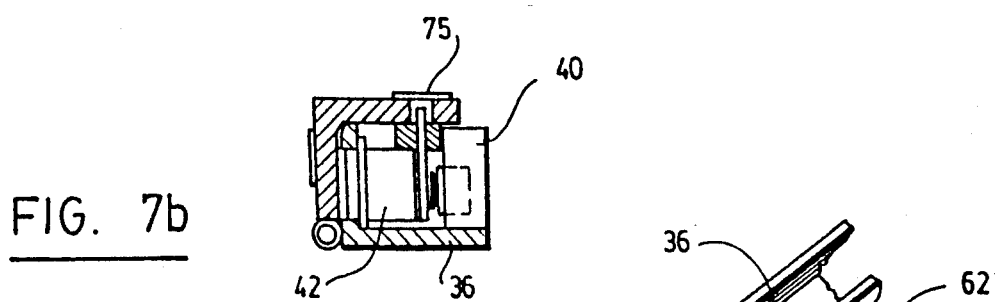
FIG. 7b is a cross section of a key lock for locking the flap member closed.
Figure 8:
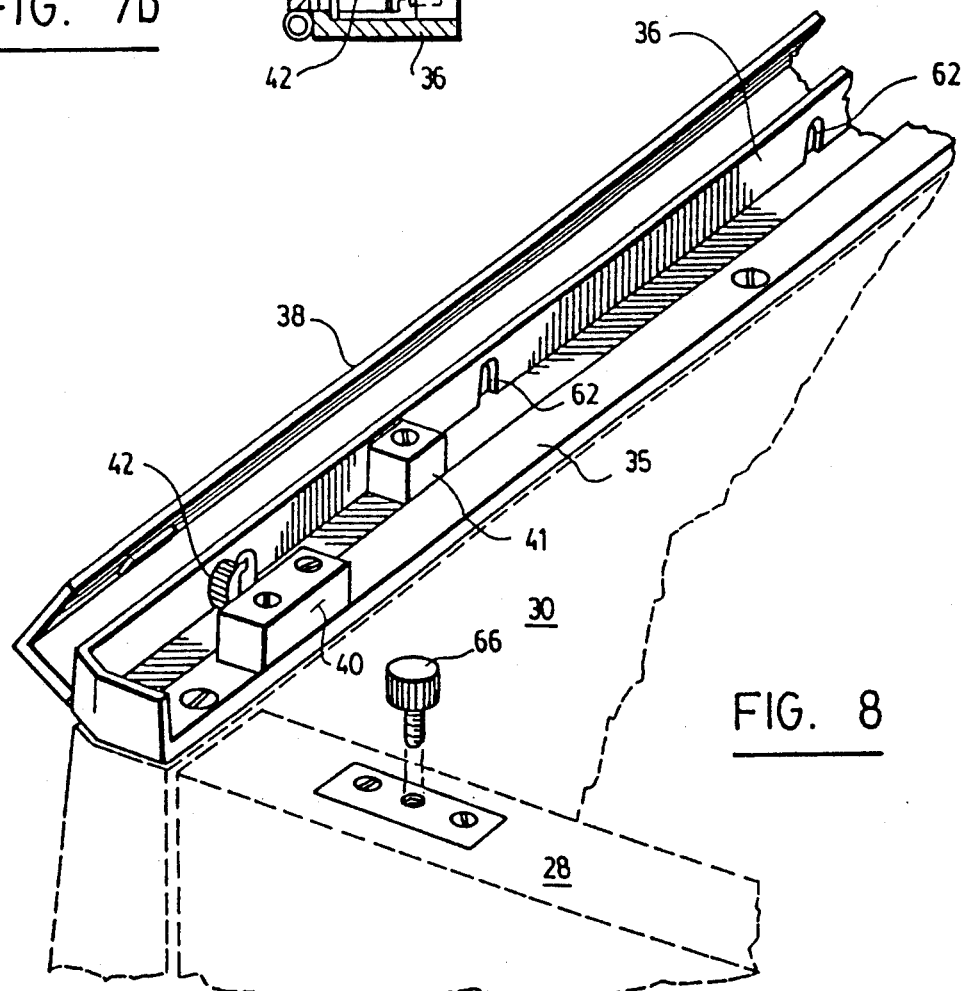
FIG. 8 shows a detailed perspective view of a rear corner of the truck box showing the securing means and tail gate pin means.
Figure 12:
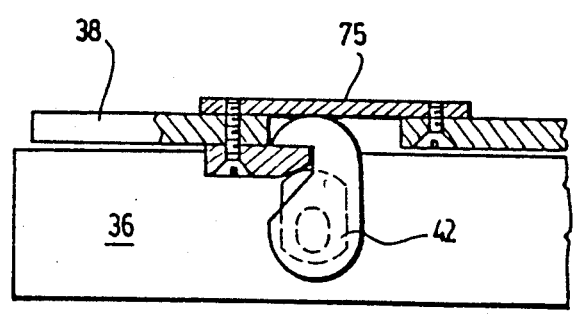
FIG. 12 shows a detailed sectional view of the locking means engaging the articulated flap member to prevent the latter from articulating open.

As shown in FIGS. 7 and 8, the locking member (38) is an articulated flap articulated about hinge (68) in order to cover the longitudinal sides of cover (26). A key lock (42) is provided with a hook member which engages with flap (38) as shown in FIG. 12. A cap (75) is to be provided over the hook member and the slot on flap (38) to protect the hook member and slot from the elements and tampering. An end of lock (42) is inserted into pin block (40) to secure lock (42) in place. As best shown in FIG. 8, locking pin or block (40) is used to block the last rib (50) against an end wall of track (36) so that it and the cover may not slide longitudinally within track (36), however when flap (38) is open, the cover may be lifted out of the tracks and rolled. Tail gate pin (66), which may be unscrewed from the tail gate in order to leave the tail gate (28) unlocked when the cover is on, is used when pin (66) is screwed in to lock the tail gate whenever the last rib (50) is in position.

Cable (55) is provided near the right angle of flap (38) so that it is hard to reach by a vandal. A plastic running surface (35) of track (36) provides an abrasion free surface for cover (26) and by the absence of surface (35) on the outside of track (36), a small gutter is formed, which is drained by holes (62). The area around lock (42) is protected by block (41) from water in the gutter.

Cable (55) does not extend to the first or to the last rib (50) so as not to interfere with lock (42), and thus an adjacent block (41) is provided to lock the end ribs connected by cable (55).

Figure 9:
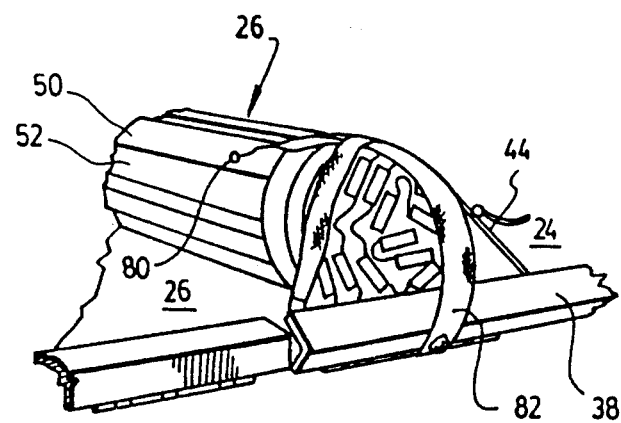
FIG. 9 shows a side perspective view of the cover apparatus having the foldable cover member in a locked position covering the forward half of the truck box with the rear half open.
Figure 10:
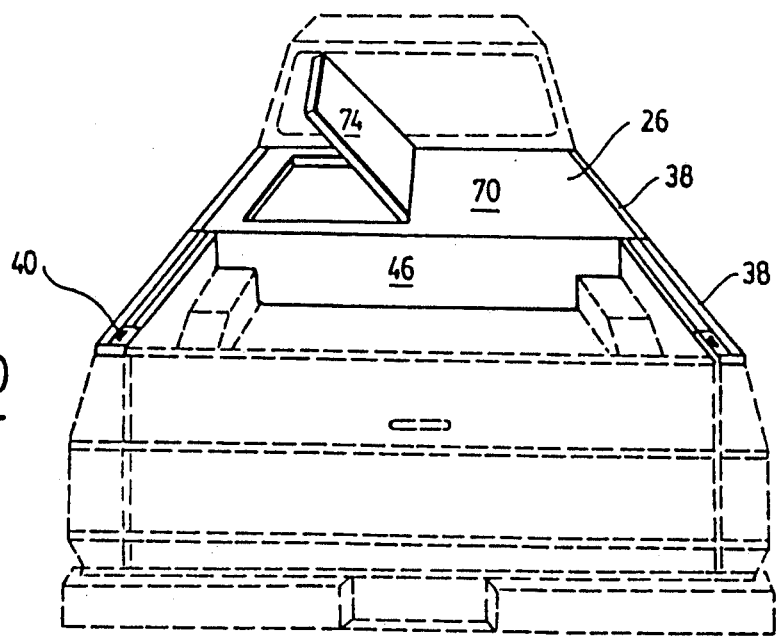
FIG. 10 shows a rear perspective view of the cover apparatus according to the other preferred embodiment, having a solid sheet material cover covering a forward part of the box and being slidable in the tracks.

As shown in FIG. 9, the locking member can be divided into two sections so that one portion of cover (26) may be locked while another portion of box (24) is left exposed. In the second preferred embodiment, a divider partition member (46) is used (as shown in FIG. 10) in order to provide security for the part of the box which is covered. Ties (44) can be used to keep the remaining portion of cover (26) rolled up. The ties (44) extend from one drain hole (62) over the rolled up cover to another hole (62) and also hook into a hole (80) in a rib (50) and an elastic strap (82) of ties (44) hook onto the open flap member (38) at hole (81) to keep it firmly secured in a partially closed position.

Figure 13:
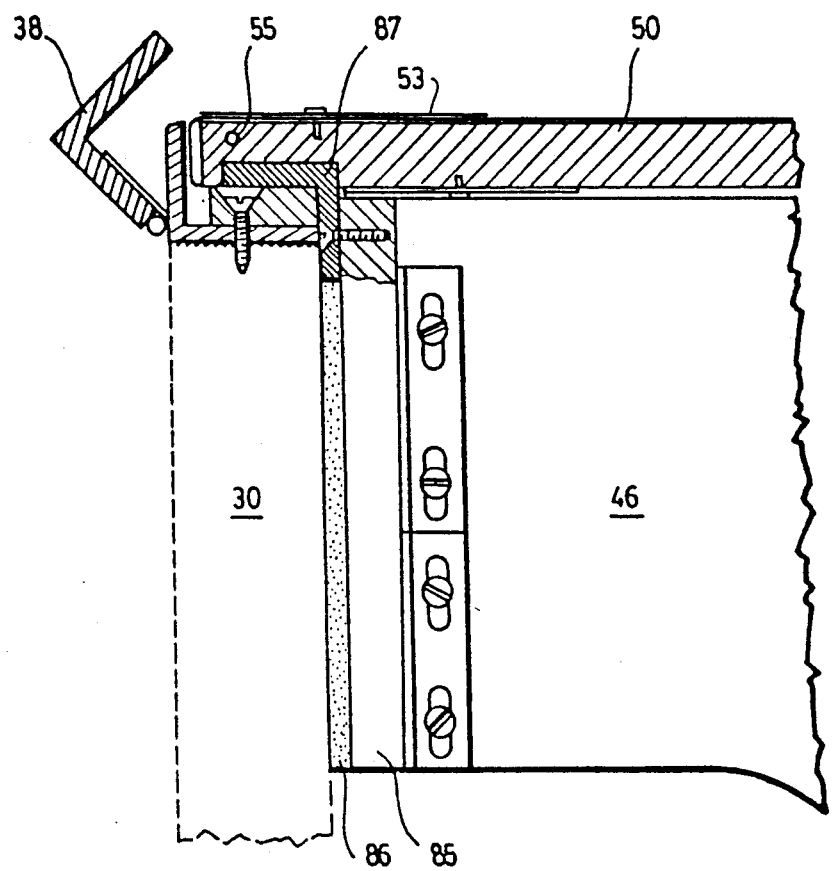
FIG. 13 shows a detailed section of the divider panel engaged in the tracks.
Figure 14:
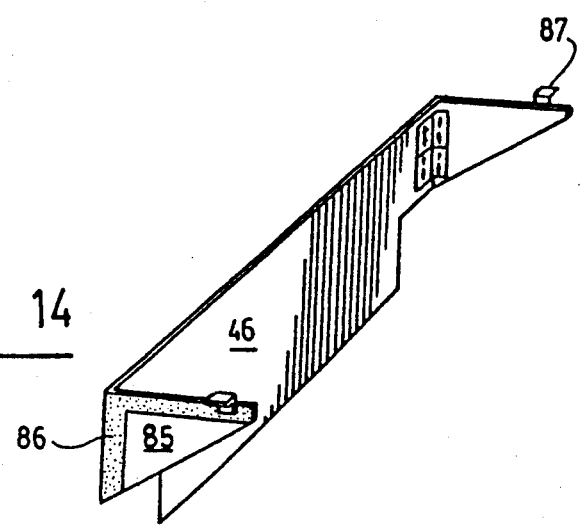
FIG. 14 is a perspective view of the divider panel.

Also in the second preferred embodiment, the cover (26) may comprise a solid sheet material cover (70), as shown in FIG. 10, which would be provided with notches for meeting with blocks (40) at either the rear or front end of tracks (36). Alternatively, a solid cover (70) may be fitted to cover only a middle portion of box (24) and would be provided with notches to engage blocks (40) provided in the middle portion of tracks (36). The solid sheet cover member (70) may advantageously be provided with one or more access hatches (74) for quick access to the contents contained therein. The divider member (46) is shown in FIGS. 13 and 14. A bottom surface rests on the truck bed and each side wing (85) has tabs (87) which are to rest in tracks (36) between two ribs (50). Padding (86) is fixed to the outside sides of wings (85) to provide a snug and abrasion free fit between side walls (30). In this construction, divider (46) cannot be lifted up or slid lengthwise when cover (26) is rolled over divider (46) and locked down by flaps (38). Divider (46) is shown having notches so that it can be placed midway in the box over the wheel fenders (48). Divider (46) can be used when only a forward or a rearward part of the box is to be locked, so that the contents of the part of the box locked by cover (26) or cover (70) are secured. When divider (46) is not to be used, it can be moved out of the way to either the front or rear of the box with wings (85) facing toward the middle.

As can be understood, the cover member (26) which is rollable may be used in conjunction with a solid cover member (70). It is also possible to create cover members which are made of rigid panels articulated together or even a cover member which has vertical walls and a roof to form a box enclosure. The purpose of the invention is to provide a cover (26) which fits vertically into tracks (36) which can be either slid therealong or rolled therein in order to facilitate access.

Figure 11:
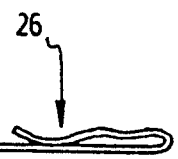
FIG. 11 shows the foldable cover in a rolled and folded formation.

As shown in FIG. 11, cover (26) may be rolled on to itself or it may be pulled back and folded over itself one or more times. As can be well appreciated, the most common and most convenient way of storing objects in a pick-up truck box (24) is either at the front end near the cab or at the rear end near the tail gate (28). Cover (26) can be released from flap (38) and rolled up either from the front end near wall (34) or from the rear end at gate wall (28).

What is claimed is:

1. A pick-up truck box cover apparatus able to securely cover a pick-up truck box, the box having two vertical sidewalls, a front vertical wall adjacent a cab of the truck and a rear gate wall pivotable between a vertical closed position and a horizontal open position, the cover apparatus comprising:
   a cover member being rigid about a lengthwise axis and having two lengthwise sides, the cover member covering all of the box;
   two lengthwise tracks to be attached to an upper surface of the two vertical sidewalls, the tracks receiving vertically the two sides of the cover member; and
   a locking member provided on each of the two tracks for preventing the cover member from being vertically removed from the tracks, and for preventing the cover member from sliding lengthwise along the tracks when locked, and for allowing the cover member to be removed from the tracks when unlocked, the cover member can be placed onto and removed from the tracks from above and be locked into the tracks to securely seal off contents of the box, the cover being rigid and resistant to impact and motion due to tampering when locked, each locking member including;
   (i) an articulated flap member articulated lengthwise about an axis parallel to one of said tracks on an outer side thereof, such that said flap can be pivoted inward and over one of said lengthwise sides;
   (ii) securing means for releasably locking said articulated flap in a position covering said one of said lengthwise sides; and
   (iii) pin means for securing the cover member against lengthwise movement once the cover member is vertically placed into the tracks, the pin means cooperating between the cover member and said one of said tracks.

2. The apparatus as claimed in claim 1, wherein the cover member is made of a flexible sheet material connected to a plurality of spaced apart cross ribs extending between the two tracks and able to provide rigidity about the lengthwise axis, a first one of said cross ribs being provided at a forward end of the cover member and being locked by said pin means, a last one of said ribs being provided at a rear end of the cover member and being locked by said pin means, the cover member thus being foldable about a crosswise axis due to the flexible sheet material.

3. The apparatus as claimed in claim 2, wherein the articulated flap comprises at least two independent lengthwise sections, whereby the independent lengthwise sections can be separately locked or unlocked.

4. The apparatus as claimed in claim 2, wherein a pair of lengthwise extending friction strips are provided on an upper surface and a lower surface respectively of the cover, so that the cover may be more easily rolled up.

5. The apparatus as claimed in claim 2, wherein tail gate pin means connect an upper surface of the rear gate wall to a crosswise undersurface of the cover, such that when the cover is connected to the rear gate wall in the vertical closed position, and the locking members prevent the cover from being lifted out of the tracks, the rear gate wall is prevented from being moved into the horizontal open position.

6. The apparatus as claimed in claim 5, wherein the tail gate pin means comprise at least one stud detachably connected to the rear gate wall and at least one complementary stud receiving formation provided on the crosswise undersurface of the cover.

7. The apparatus as claimed in claim 1, further comprising a crosswise divider and means for supporting the crosswise divider, wherein the divider may partition the box into separate compartments.

8. The apparatus as claimed in claim 7, wherein the cover member is made of a flexible sheet material connected to a plurality of spaced apart cross ribs extending between the two tracks and able to provide rigidity about the lengthwise axis, a first one of said cross ribs being provided at a forward end of the cover member and being locked by said pin means, a last one of said ribs being provided at a rear end of the cover member and being locked by said pin means, the cover member thus being foldable about a crosswise axis due to the flexible sheet material, and said means for supporting comprise wings at each side end of the divider, the wings having tabs for resting on the tracks between two of said ribs, such that when the cover member is locked over the tabs, the wings and the divider, the divider is supported in said box in a fixed position.

9. The apparatus as claimed in claim 8, wherein a pair of lengthwise extending friction strips are provided on an upper surface and a lower surface respectively of the cover in the same vertical plane, so that the cover may be more easily rolled up.

10. The apparatus as claimed in claim 2, wherein straps are provided to tie down the cover when partially folded or rolled up, the straps engaging the cover and the locking members or tracks in order to fix the position of the cover with respect to the locking members or tracks.

11. The apparatus as claimed in claim 2, wherein a number of contiguous ones of the cross ribs are interconnected by two flexible cable members, said pin means preventing a first one of said number of ribs from moving in a direction of a last one of said number of ribs and the last one of said number of ribs from moving toward the first one of said number of ribs, the flexible members being provided along the lengthwise sides of said cover member.

12. A pick-up truck box cover apparatus able to securely cover a pick-up truck box, the box having two vertical sidewalls, a front vertical wall adjacent a cab of the truck and a rear gate wall pivotable between a vertical closed position and a horizontal open position, the cover apparatus comprising:
   a cover member being rigid about a lengthwise axis and having two lengthwise sides, the cover member covering a lengthwise part of the box;
   two lengthwise tracks to be attached to an upper surface of the two vertical sidewalls, the tracks receiving vertically the two sides of the cover member;
   a vertical crosswise divider and supporting means for supporting the crosswise divider for partitioning the box into separate compartments, the cover member covering at least one partition formed by the divider; and
   a locking member provided on each of the two tracks for preventing the cover member from being vertically removed from the tracks, and for preventing the cover member from sliding lengthwise along the tracks when locked, and for allowing the cover member to be removed from the tracks when unlocked, the cover member can be placed onto and removed from the tracks from above and be locked into the tracks to securely seal off contents of the box, the cover being rigid and resistant to impact and motion due to tampering when locked, each locking member including;
   (i) an articulated flap member articulated lengthwise about an axis parallel to one of said tracks on an outer side thereof, such that said flap can be pivoted inward and over one of said lengthwise sides;
   (ii) securing means for releasably locking said articulated flap in a position covering said one of said lengthwise sides; and
   (iii) pin means for securing the cover member against lengthwise movement once the cover member is vertically placed into the tracks, the pin means cooperating between the cover member and said one of said tracks.

13. The apparatus as claimed in claim 12, wherein the cover member is made of a flexible sheet material connected to a plurality of spaced apart cross ribs extending between the two tracks and able to provide rigidity about the lengthwise axis, a first one of said cross ribs being provided at a forward end of the cover member and being locked by said pin means, a last one of said ribs being provided at a rear end of the cover member and being locked by said pin means, the cover member thus being foldable about a crosswise axis due to the flexible sheet material; and wherein
   said means for supporting comprise wings at each side end of the divider, the wings having tabs for resting on the tracks between two of said ribs, such that when the cover member is locked over the tabs, the wings and the divider, the divider is supported in said box in a fixed position.

14. The apparatus as claimed in claim 13, wherein tail gate pin means connect an upper surface of the rear gate wall to a crosswise undersurface of the cover, such that when the cover is connected to the rear gate wall in the vertical closed position, and the locking members prevent the cover from being lifted out of the tracks, the rear gate wall is prevented from being moved into the horizontal open position.

15. The apparatus as claimed in claim 14, wherein the tail gate pin means comprise at least one stud detachably connected to the rear gate wall and at least one complementary stud receiving formation provided on the crosswise undersurface of the cover.

16. The apparatus as claimed in claim 13, wherein a pair of lengthwise extending friction strips are provided on an upper surface and a lower surface respectively of the cover, so that the cover may be more easily rolled up.

17. The apparatus as claimed in claim 13, wherein a number of contiguous ones of the cross ribs are interconnected by two flexible cable members, said pin means preventing a first one of said number of ribs from moving in a direction of a last one of said number of ribs and the last one of said number of ribs from moving toward the first one of said number of ribs, the flexible members being provided along the lengthwise sides of said cover member.

18. The apparatus as claimed in claim 12, wherein the cover member comprises a solid sheet of material, the solid sheet being provided with at least one access hatch.

* * * * *